United States Patent
Wang et al.

(10) Patent No.: US 10,184,641 B2
(45) Date of Patent: Jan. 22, 2019

(54) LIGHT-EMITTING DEVICE AND PROJECTION SYSTEM

(71) Applicant: Appotronics Corporation Limited, Shenzhen (CN)

(72) Inventors: Zeqin Wang, Shenzhen (CN); Yi Li, Shenzhen (CN); Zuqiang Guo, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 15/564,159

(22) PCT Filed: Apr. 5, 2016

(86) PCT No.: PCT/CN2016/078427
§ 371 (c)(1),
(2) Date: Oct. 3, 2017

(87) PCT Pub. No.: WO2016/165569
PCT Pub. Date: Oct. 20, 2016

(65) Prior Publication Data
US 2018/0080630 A1    Mar. 22, 2018

(30) Foreign Application Priority Data
Apr. 9, 2015  (CN) ...................... 2015 2 0211124 U

(51) Int. Cl.
*F21V 9/30*    (2018.01)
*F21V 13/02*   (2006.01)
(Continued)

(52) U.S. Cl.
CPC ............. *F21V 9/30* (2018.02); *F21V 13/02* (2013.01); *F21V 13/12* (2013.01); *F21V 14/08* (2013.01);
(Continued)

(58) Field of Classification Search
CPC .. G03B 21/204; G03B 21/206; G03B 21/208; G03B 21/2013; G03B 21/2033;
(Continued)

(56) References Cited

U.S. PATENT DOCUMENTS

2012/0201030 A1* 8/2012 Yuan .................... G02B 26/008
                                                    362/293
2012/0242912 A1* 9/2012 Kitano ................. H04N 9/3111
                                                    348/759
(Continued)

FOREIGN PATENT DOCUMENTS

CN      102645830 A     8/2012
CN      103019017 A     4/2013
(Continued)

OTHER PUBLICATIONS

International Search Report for Application No. PCT/CN2016/078427, dated Jul. 4, 2016, 3 pages.

*Primary Examiner* — Sultan Chowdhury
(74) *Attorney, Agent, or Firm* — Seed Intellectual Property Law Group LLP

(57) ABSTRACT

A light emitting device includes a light source module comprising an excitation light source for emitting exciting light and a compensation light source for emitting compensation light; and a color wheel component, comprising at least one segmented region distributed in a motion direction of the color wheel component. The color wheel component emits the compensation light and first light that comprises at least one beam of excited light under irradiation of the excitation light source and the compensation light source. The compensation light spectrally overlaps the at least one beam of excited light in the first light, and the compensation light and the excited light spectrally overlapping the compensation light are simultaneously emitted and are indepen-
(Continued)

dently adjustable. A projection system comprising a light emitting device is further provided.

20 Claims, 7 Drawing Sheets

(51) Int. Cl.
F21V 13/12 (2006.01)
F21V 14/08 (2006.01)
G03B 21/20 (2006.01)
H05B 33/08 (2006.01)
G03B 33/08 (2006.01)
F21V 13/00 (2006.01)
F21Y 113/13 (2016.01)

(52) U.S. Cl.
CPC ....... G03B 21/204 (2013.01); G03B 21/2013 (2013.01); G03B 21/2053 (2013.01); G03B 21/2093 (2013.01); G03B 33/08 (2013.01); H05B 33/0845 (2013.01); *F21V 13/00* (2013.01); *F21Y 2113/13* (2016.08)

(58) Field of Classification Search
CPC ............ G03B 21/2053; H04N 9/3114; H04N 9/3155; H04N 9/3164; H04N 9/3182; F21V 13/02; F21V 13/12
See application file for complete search history.

(56) References Cited

U.S. PATENT DOCUMENTS

| | | | |
|---|---|---|---|
| 2013/0075633 A1* | 3/2013 | Hu | H05B 33/0833 250/552 |
| 2014/0204558 A1* | 7/2014 | Bartlett | G02B 26/008 362/84 |
| 2016/0223892 A1* | 8/2016 | Takahashi | H04N 9/3111 |

FOREIGN PATENT DOCUMENTS

| | | |
|---|---|---|
| CN | 103424837 A | 12/2013 |
| CN | 104298059 A | 1/2015 |
| CN | 204595411 U | 8/2015 |
| CN | 204595412 U | 8/2015 |
| JP | 4632719 B2 | 2/2011 |
| TW | 201307985 A | 2/2013 |
| TW | 201310156 A | 3/2013 |

* cited by examiner

LIGHT-EMITTING DEVICE AND PROJECTION SYSTEM

BACKGROUND

Technical Field

The present disclosure relates to the field of optical technologies, and in particular, to a light emitting device and a projection system.

Description of the Related Art

The prior art provides a light emitting device for a projection system in which a semiconductor laser diode excites different wavelength conversion layers and/or scattering layers disposed in a motion direction of a color wheel component to form different primary light. The light emitting device has the advantages of high luminous efficiency and small etendue, and thus has developed rapidly to become an ideal choice for light emitting devices for single-chip, two-chip, and three-chip projection systems.

A light emitting device in which a blue laser diode irradiates a color wheel component including three segmented regions to sequentially emit blue light, green light, and red light is generally used in an existing single-chip projection system. The color wheel component including three segmented regions includes a segmented region provided with a blue light scattering layer, a segmented region provided with a green light wavelength conversion layer, and a segmented region provided with a red light wavelength conversion layer that are distributed in a motion direction of the color wheel component.

A light emitting device in which a blue laser diode irradiates a color wheel component including two segmented regions to sequentially emit blue light and yellow light is generally used in an existing two-chip projection system. The color wheel component including two segmented regions includes a segmented region provided with a blue light scattering layer and a segmented region provided with a yellow light wavelength conversion layer that are distributed in a motion direction of the color wheel component.

A light emitting device in which a blue laser diode irradiates a color wheel component having a yellow light wavelength conversion layer distributed in a motion direction of the color wheel component to produce white light is generally used in an existing three-chip projection system.

In the aforementioned light emitting device used in the single-chip, two-chip, or three-chip projection system, due to the low light conversion efficiency of a wavelength conversion material contained in a wavelength conversion layer or for other reasons, some primary light, for example, red light, green light, or blue light, in light emitted by the light emitting device may have color coordinates and a color gamut deviated from required color coordinates and color gamut standard, for example, a DCI or REC.709 color gamut standard, causing degradation of the quality of a projected image.

BRIEF SUMMARY

Accordingly, the present disclosure provides a light emitting device and a projection system to solve the problem in which a color gamut achieved by an existing projection system deviates from a required standard color gamut.

In a first aspect, a light emitting device is provided, comprising:

a light source module, including an excitation light source for emitting exciting light and a compensation light source for emitting compensation light; and a color wheel component, including at least one segmented region distributed in a motion direction of the color wheel component, wherein the color wheel component emits the compensation light and a first light that includes at least one excited light under irradiation of the excitation light source and the compensation light source, wherein the compensation light spectrally overlaps the at least one excited light in the first light, the compensation light is emitted in a time period when the excited light spectrally overlapping the compensation light is emitted, and the compensation light and the excited light spectrally overlapping the compensation light are independently adjustable.

Preferably, a time period of the compensation light source emitting the compensation light is the same as a time period of the color wheel emitting the excited light spectrally overlapping the compensation light under irradiation of the excitation light source.

Preferably, at least one segmented region in the at least one segmented region is provided with a wavelength conversion layer, and the wavelength conversion layer absorbs the exciting light to emit the excited light.

Preferably, the compensation light source is turned on when the excitation light source irradiates the segmented region, of the color wheel component, provided with the wavelength conversion layer that absorbs the exciting light to emit the excited light spectrally overlapping the compensation light, and turned off when the excitation light source irradiates remaining segmented regions.

Preferably, at least one segmented region not provided with a wavelength conversion layer in the at least one segmented region is provided with a scattering layer, and the scattering layer scatters and emits the exciting light emitted by the excitation light source.

Preferably, the compensation light source is turned on when the excitation light source irradiates the segmented region provided with the wavelength conversion layer that absorbs the exciting light to emit the excited light and the segmented region provided with the scattering layer of the color wheel component, and turned off when the excitation light source irradiates remaining segmented regions.

Preferably, the excitation light source is turned on in all the segmented regions of the color wheel component, or the light source module further includes a third light source for emitting third light, the third light and the exciting light are light of the same color and different spectra, the excitation light source is turned on when the segmented region of the color wheel component provided with the wavelength conversion layer is located in the output light path of the light source module and turned off when other segmented regions, and the third light source is turned on when the segmented region of the color wheel component provided with the scattering layer is located in the output light path of the light source module and turned off when other segmented regions is located in the output light path of the light source module.

Preferably, the compensation light source includes a red laser source for emitting red light and/or a cyan-green laser source for emitting cyan-green light, and the excitation light source is a blue laser source for emitting blue light.

Preferably, a dominant wavelength of the blue light emitted by the excitation light source is 445 nm, a dominant wavelength of the cyan-green light emitted by the cyan-green laser source is any value between 510 nm and 530 nm including endpoint values, and a dominant wavelength of the red light emitted by the red laser source is any value between 625 nm and 645 nm including endpoint values.

Preferably, the dominant wavelength of the cyan-green light emitted by the cyan-green laser source is 520 nm, and the dominant wavelength of the red light emitted by the red laser source is 638 nm.

Preferably, the light emitting device further comprises:

a control device for controlling a ratio between the compensation light and the excited light spectrally overlapping the compensation light by controlling output power of the compensation light source and output power of the excitation light source.

Preferably, the control device further comprises:

a brightness control unit for increasing or decreasing brightness of the compensation light and brightness of the excited light spectrally overlapping the compensation light equally.

Preferably, the control device further comprises:

a PWM controller for controlling a luminous intensity of laser emitted by the cyan-green laser source and/or the red laser source.

Preferably, the color wheel component emits sequential red light, green light, and blue light under irradiation of the excitation light source; and the compensation light source includes cyan-green laser and/or red laser, a time period of the cyan-green laser of the compensation light source is the same as a time period of the blue light and the green light emitted by the color wheel component, and a time period of the red laser of the compensation light source is the same as a time period of the red light emitted by the color wheel component.

Preferably, the color wheel component includes a fluorescent wheel and a filter wheel rotating synchronously with the fluorescent wheel, wherein the fluorescent wheel includes a green fluorescent region, a blue scattering region, and a red fluorescent region; and the filter wheel includes a green filter region disposed corresponding to the green fluorescent region and a red filter region disposed corresponding to the red fluorescent region.

Preferably, a surface of the green fluorescent region is provided with green fluorescent powder, a surface of the blue scattering region is provided with scattering powder, and a surface of the red fluorescent region is provided with red fluorescent powder.

Preferably, the green filter region is used for filtering partial light of short wavelengths and long wavelengths in light emitted by the green fluorescent region, the short wavelengths range from 460 nm to 490 nm including endpoint values, and the long wavelengths range from 590 nm to 600 nm including endpoint values; and the red filter region is used for filtering partial light of long wavelengths in light emitted by the red fluorescent region, and the long wavelengths range from 590 nm to 600 nm including endpoint values.

Preferably, the color wheel component emits sequential blue light and yellow light under excitation of the excitation light source; and the compensation light source includes cyan-green laser and/or red laser; the cyan-green laser of the compensation light source is turned on in the entire time period of the color wheel component, and a time period of the red laser of the compensation light source is the same as a time period of the yellow light emitted by the color wheel component.

Preferably, the color wheel component emits white light under excitation of the excitation light source in the entire time period; and the compensation light source includes cyan-green laser and/or red laser, and the excitation light source and the compensation light source that are included in the light source module are both turned on in the entire time period.

Preferably, the excitation light source includes a first blue laser diode, the color wheel component includes an all-yellow color wheel, the all-yellow color wheel emits yellow light under excitation of the first blue laser diode and transmits part of blue light of the first blue laser diode, and the emitted yellow light and the transmitted blue light form white light for emission.

Preferably, the excitation light source further includes a second blue laser diode, and the color wheel component further includes an all-blue color wheel and a dichroic mirror, and the all-blue color wheel performs scattering and decoherence on blue light emitted by the second blue laser diode; and the dichroic mirror is used for filtering blue light in the white light emitted by the all-yellow color wheel so that the yellow light emitted by the all-yellow color wheel and standard blue light emitted by the all-blue color wheel form white light for emission.

Preferably, a dominant wavelength of blue laser emitted by the second blue laser diode is 462 nm.

In a second aspect, a projection system is provided, including the aforementioned light emitting device.

Preferably, the projection system further includes an imaging component, wherein the imaging component includes a TIR prism, a DMD chip, and a projection lens, and the TIR prism is used for guiding light emitted by the color wheel component to the DMD chip and guiding imaging light emitted by the DMD chip to the projection lens.

Preferably, the projection system further includes a light splitting device, and the light splitting device includes:

a first light path and a second light path, wherein in a time period of yellow light of the color wheel component, the light splitting device is used for splitting the yellow light into green light and red light, the split green light and cyan-green laser of the compensation light source are modulated through the first light path, and the split red light and red laser of the compensation light source are modulated through the second light path.

Preferably, in a time period when the color wheel component emits blue light, the blue light and the cyan-green laser are modulated through the first light path or the second light path.

Preferably, in a time period when the color wheel component emits blue light, the first light path is used for distributing the blue light, the second light path is used for distributing the cyan-green laser, and the blue light and the cyan-green laser are simultaneously modulated through the first light path and the second light path.

Preferably, the light splitting device further includes a third light path, and in a time period in which the color wheel component emits blue light, the third light path is used for modulating the blue light and the cyan-green laser.

Preferably, when the color wheel component emits white light under excitation of the excitation light source in the entire time period, the projection system further includes a light splitting device, and the light splitting device distributes blue light in the white light to a first light path for modulation, distributes red light in the white light and the red laser to a second light path for modulation, and distributes green light in the white light and the cyan-green laser to a third light path for modulation.

Preferably, when the light splitting device distributes the blue light in the white light to the first light path for modulation, the light splitting device further distributes cyan light in part of yellow light to the first light path for simultaneous modulation with the blue light.

As compared with the prior art, the technical solution provided in the present disclosure has advantages such as, for example, the following advantages:

In the present disclosure, a compensation light source is added, compensation light emitted by the compensation light source spectrally overlaps excited light emitted by a color wheel component under irradiation of an excitation light source, and the compensation light and the excited light emitted by the color wheel component under irradiation of the excitation light source and spectrally overlapping the compensation light are simultaneously emitted and are independently adjustable; the compensation light and the excited light are combined so that color coordinates of primary light corresponding to the excited light can be adjusted, and then a color gamut of a projection system using the light emitting device can be adjusted.

BRIEF DESCRIPTION OF THE SEVERAL VIEWS OF THE DRAWINGS

In order to more clearly illustrate the technical solutions in embodiments of the present disclosure or the prior art, the drawings which need to be used in the description of the embodiments or the prior art will be introduced briefly below. It is apparent that the drawings described below are merely some embodiments of the present disclosure, and those of ordinary skill in the art can also obtain other drawings according to these drawings without making creative efforts.

DETAILED DESCRIPTION

The present disclosure provides a light emitting device, comprising:

a light source module, including an excitation light source for emitting exciting light and a compensation light source for emitting compensation light; and a color wheel component, including at least one segmented region distributed in a motion direction of the color wheel component, wherein the color wheel component emits the compensation light and first light that includes at least one excited light under irradiation of the excitation light source and the compensation light source, wherein the compensation light spectrally overlaps the at least one excited light in the first light, the compensation light and the excited light spectrally overlapping the compensation light are simultaneously emitted, and the compensation light and the excited light spectrally overlapping the compensation light are independently adjustable.

The present disclosure further provides a projection system including the aforementioned light emitting device.

A core idea of the present disclosure is provided above. In order to make the aforementioned objectives, features, and advantages of the present disclosure more comprehensible, specific manners of implementing the present disclosure are described in detail below with reference to the drawings.

Many specific details are provided in the following description to facilitate full understanding of the present disclosure, but the present disclosure can also be implemented in other manners different from those described herein, and those skilled in the art can make similar application without departing from the essence of the present disclosure; therefore, the present disclosure is not limited to the following disclosed specific embodiments.

Secondly, the present disclosure is described in detail with reference to schematic views. In describing the embodiments of the present disclosure in detail, for ease of illustration, sectional views representing device structures are not partially enlarged according to a general scale. Moreover, the schematic views are merely exemplary, instead of limiting the protection scope of the present disclosure. In addition, three-dimensional sizes including length, width, and depth, should be included in practical manufacturing.

A detailed description is provided below through several exemplary embodiments.

Embodiment 1

Figure 1:
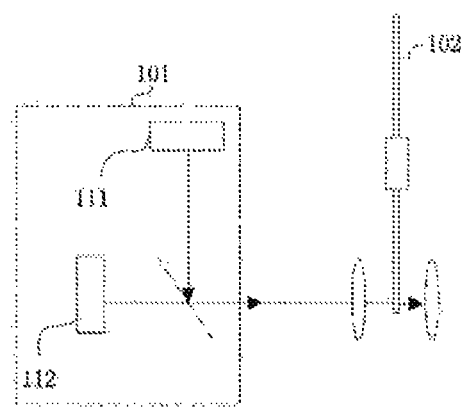
FIG. 1 is a schematic structural view of a light emitting device provided in an embodiment of the present disclosure.

This embodiment provides a light emitting device. As shown in FIG. 1, the light emitting device includes a light source module 101, and the light source module 101 includes an excitation light source 111 for emitting exciting light and a compensation light source 112 for emitting compensation light.

The light emitting device further includes a color wheel component 102 located in a transmission light path of the exciting light emitted by the excitation light source 111 and the compensation light emitted by the compensation light source 112. The color wheel component 102 emits the compensation light and first light that includes at least one excited light under irradiation of the exciting light emitted by the excitation light source 111 and the compensation light emitted by the compensation light source 112. The compensation light spectrally overlaps at least one excited light in the first light, the compensation light and the excited light spectrally overlapping the compensation light are simultaneously emitted, and the compensation light and the excited light spectrally overlapping the compensation light are independently adjustable.

Specifically, the color wheel component 102 includes at least one segmented region distributed in a motion direction of the color wheel component 102. The motion direction of the color wheel component 102 includes, but is not limited to, circumferential motion, horizontal motion, or vertical motion. At least one segmented region in the at least one segmented region included in the color wheel component 102 is provided with a wavelength conversion layer containing a wavelength conversion material, and another segmented region is provided with a scattering layer containing a scattering material. The wavelength conversion material absorbs the exciting light emitted by the excitation light source 111 to emit excited light, and the scattering material is capable of scattering and emitting incident light. The wavelength conversion material may be fluorescent powder, quantum dots, or the like. The scattering material may be scattering powder or the like.

Preferably, the wavelength conversion layer provided in the at least one segmented region in the at least one segmented region included in the color wheel component 102 is capable of absorbing the exciting light emitted by the excitation light source 111 and emitting the excited light spectrally overlapping the compensation light. For example, when the compensation light source 112 is a red laser source, the color wheel component 102 includes at least one segmented region provided with a red light wavelength conversion layer; when the compensation light source 112 is a cyan-green laser source, the color wheel component 102 includes at least one segmented region provided with a green light wavelength conversion layer, and so on. Other forms may also exist and will not be listed one by one herein.

In this embodiment, the specific implementation manner of simultaneously emitting the compensation light and the excited light spectrally overlapping the compensation light may be as follows: making a time period of the compensation light source emitting the compensation light the same as a time period of the color wheel component emitting the excited light under irradiation of the excitation light source and spectrally overlapping the compensation light. Specifically, the compensation light source 112 is turned on when the segmented region, of the color wheel component 102, provided with the wavelength conversion layer that absorbs the exciting light to emit the excited light spectrally overlapping the compensation light is located in the output light path of the light source module, and turned off when remaining segmented regions is located in the output light path of the light source module. An example is provided below for illustration.

Assuming that the compensation light is red light, a time period of the compensation light source 112 emitting the red light is the same as a time period of the color wheel component 102 emitting the red light under irradiation of the exciting light emitted by the excitation light source. Specifically, the excitation light source 111 and the compensation light source 112 may be simultaneously turned on when the segmented region, of the color wheel component 102, provided with the wavelength conversion layer that absorbs the exciting light emitted by the excitation light source 111 to emit the red light is located in an output light path of the excitation light source and the compensation light source, and the compensation light source 112 is turned off in other segmented regions. In this way, the time period of the compensation light source 112 emitting the red light can be the same as the time period of the color wheel component 102 emitting the red light under irradiation of the excitation light source 111.

In an embodiment of the present disclosure, the excitation light source 111 is turned on in all the segmented regions of the color wheel component 102 so that when the segmented region of the color wheel component 102 provided with the scattering layer is located in the transmission light path of the excitation light source 111, the exciting light emitted by the excitation light source 111 is incident on the scattering layer, and scattered and emitted by the scattering layer.

In another embodiment of the present disclosure, the light source module further includes a third light source for emitting third light, and the third light emitted by the third light source and the exciting light emitted by the excitation light source 111 are light of the same color and different spectra. The third light source is turned on when the segmented region of the color wheel component 102 provided with the scattering layer is located in the output light path of the light source module and turned off when other segmented regions is located in the output light path of the light source module. The excitation light source 111 is turned on when the segmented region of the color wheel component 102 provided with the wavelength conversion layer is located in the output light path of the light source module and turned off when other segmented regions is located in the output light path of the light source module. The light of the same color and different spectra refers to light having the same color but different spectra.

The excitation light source 111 may be a blue light source, for example, a blue laser source or a blue LED light source, and a dominant wavelength of blue light emitted by the excitation light source 111 may be 445 nm. The compensation light source 112 includes a red laser source for emitting red light and/or a cyan-green laser source for emitting cyan-green light. A dominant wavelength of the cyan-green light emitted by the cyan-green laser source may be any value between 510 nm and 530 nm including endpoint values, and preferably, the dominant wavelength of the cyan-green light is 520 nm. A dominant wavelength of the red light emitted by the red laser source may be any value between 625 nm and 645 nm including endpoint values, and preferably, the dominant wavelength of the red light emitted by the red laser source is 638 nm. The third light source is a blue laser source emitting blue light having a dominant wavelength different from the dominant wavelength of the blue light emitted by the excitation light source 111. For example, the dominant wavelength of the blue light emitted by the third light source may be 462 nm.

Figure 2:
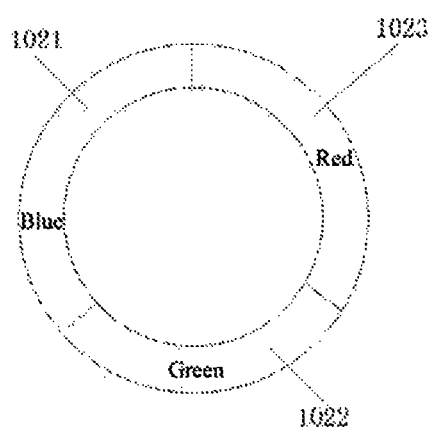
FIG. 2 is a schematic view illustrating segmented regions of a color wheel component provided in an embodiment of the present disclosure.
Figure 3:
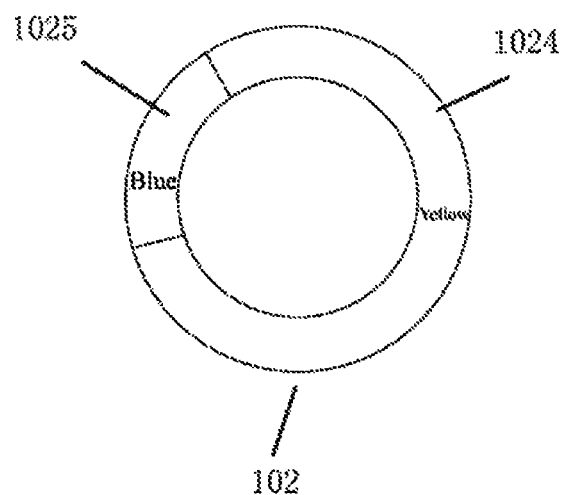
FIG. 3 is a schematic view illustrating segmented regions of the color wheel component provided in another embodiment of the present disclosure.
Figure 4:
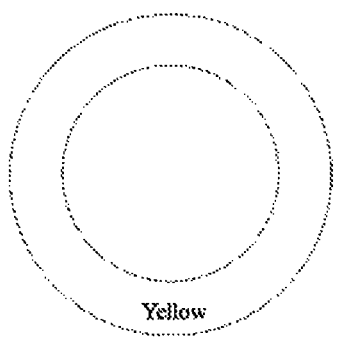
FIG. 4 is a schematic view illustrating segmented regions of the color wheel component provided in another embodiment of the present disclosure.

Referring to FIGS. 2 to 4, they are diagrams illustrating distribution examples of segmented regions on the color wheel component 102 provided in embodiments of the present disclosure, but the distribution of the segmented regions on the color wheel component 102 is not limited to those shown in FIGS. 2 to 4.

In FIG. 2, the color wheel component 102 is disc-shaped, and the color wheel component 102 includes a segmented region (referred to as a blue scattering region) 1021 provided with a scattering layer, a segmented region (referred to as a green fluorescent region) 1022 provided with a green light wavelength conversion layer, and a segmented region (referred to as a red fluorescent region) 1023 provided with a red light wavelength conversion layer that are disposed in a circumferential motion direction of the color wheel component 102.

If the light source module includes the excitation light source 111 and the compensation light source 112, wherein the compensation light source 112 includes the cyan-green laser source and the red laser source, the excitation light source 111 and the red laser source are turned on when the segmented region of the color wheel component 102 provided with the red light wavelength conversion layer is located in the output light path of the light source module, the excitation light source 111 and the cyan-green laser source are turned on when the segmented region provided with the green light wavelength conversion layer is located in the output light path of the light source module, and the excitation light source 111 is turned on when the segmented region provided with the scattering layer is located in the output light path of the light source module, or the excitation light source 111 and the cyan-green laser source are turned on when the segmented region provided with the scattering layer is located in the output light path of the light source module, so that the segmented region of the color wheel component 102 provided with the red light wavelength conversion layer emits excited red light and red laser simultaneously, the segmented region provided with the green light wavelength conversion layer emits excited green light and cyan-green laser simultaneously, and the segmented region provided with the scattering layer emits blue light or emits blue light and cyan-green laser simultaneously.

If the light source module includes the excitation light source 111, the compensation light source 112, and the third light source, the excitation light source 111 and the red laser source are turned on when the segmented region of the color wheel component 102 provided with the red light wavelength conversion layer is located in the output light path of the light source module, the excitation light source 111 and the cyan-green laser source are turned on when the segmented region provided with the green light wavelength conversion layer is located in the output light path of the light source module, and the third light source is turned on when the segmented region provided with the scattering layer is located in the output light path of the light source module, or the third light source and the cyan-green laser source are turned on when the segmented region provided with the scattering layer is located in the output light path of the light source module, so that the segmented region provided with the red light wavelength conversion layer emits excited red light and red laser simultaneously, the segmented region provided with the green light wavelength conversion layer emits excited green light and green laser simultaneously, and the segmented region provided with the scattering layer emits third light, or the segmented region provided with the scattering layer emits third light and cyan-green laser simultaneously, wherein the third light is blue light.

In FIG. 3, the color wheel component 102 is disc-shaped, and the color wheel component 102 includes a segmented region (also referred to as a yellow fluorescent region) 1024 provided with a yellow light wavelength conversion layer and a segmented region (also referred to as a blue light scattering region) 1025 provided with a scattering layer that are disposed in a circumferential motion direction of the color wheel component 102.

If the light source module 101 includes the excitation light source 111 and the compensation light source 112, and the compensation light source 112 includes the cyan-green laser source and the red laser source, the excitation light source 111 and the red laser source and/or the cyan-green laser source are turned on when the segmented region of the color wheel component 102 provided with the yellow light wavelength conversion layer is located in the output light path of the light source module, and the excitation light source 111 or the excitation light source 111 and the cyan-green laser source are turned on when the segmented region provided with the scattering layer is located in the output light path of the light source module, so that the segmented region of the color wheel component 102 provided with the yellow light wavelength conversion layer emits yellow light and red light simultaneously, emits yellow light and cyan-green light simultaneously, or emits yellow light, red light, and cyan-green light simultaneously, and the segmented region provided with the scattering layer emits blue light or emits blue light and cyan-green light simultaneously.

If the light source module includes the excitation light source 111, the compensation light source 112, and the third light source, the excitation light source 111 and the cyan-green laser source and/or the red laser source are turned on when the segmented region of the color wheel component 102 provided with the yellow light wavelength conversion layer is located in the output light path of the light source module, and the third light source is turned on or the third light source and the cyan-green laser source are turned on when the segmented region of the color wheel component 102 provided with the scattering layer is located in the output light path of the light source module, so that the segmented region of the color wheel component 102 provided with the yellow light wavelength conversion layer emits yellow light and red light simultaneously, emits yellow light and cyan-green light simultaneously, or emits yellow light, red light, and cyan-green light simultaneously, and the segmented region provided with the scattering layer emits blue light or emits blue light and cyan-green light simultaneously.

In FIG. 4, the color wheel component 102 is disc-shaped, and the color wheel component 102 is a color wheel having a pure color segment, that is, a yellow light wavelength conversion layer containing a yellow light wavelength conversion material is disposed throughout a circumferential direction of the color wheel component 102.

If the light source module includes the excitation light source 111 and the compensation light source 112, the excitation light source 111 and the red laser source and/or the cyan-green laser source are turned on in the entire motion cycle of the color wheel component 102 so that the color wheel component 102 emits yellow light, blue light, and red light, or yellow light, blue light, and cyan-green light, or yellow light, blue light, red light, and cyan-green light simultaneously.

If the light source module includes the excitation light source 111, the compensation light source 112, and the third light source, the excitation light source 111, the third light source, and the red laser source and/or the cyan-green laser source are turned on in the entire motion cycle of the color wheel component 102, so that the color wheel component 102 emits yellow light, third light (which is blue light), and red light, or yellow light, third light (which is blue light), and cyan-green light, or yellow light, third light (which is blue light), red light, and cyan-green light simultaneously.

Embodiment 2

Figure 5:
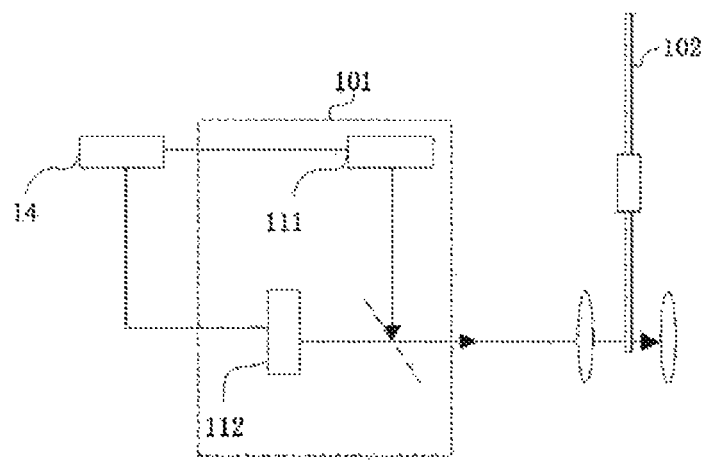
FIG. 5 is a schematic structural view of a light emitting device provided in another embodiment of the present disclosure.

FIG. 5 illustrates the structure of a light emitting device provided in another embodiment of the present disclosure. The light emitting device further differs from the light emitting device described in Embodiment 1 by further including a control device 14. The rest is the same as Embodiment 1, so reference is made to the aforementioned Embodiment 1 for parts not detailed in this embodiment.

The control device 14 controls the excitation light source 111 and the compensation light source 112. The control device 14 controls a ratio between the compensation light and the excited light spectrally overlapping the compensation light by controlling output power of the compensation light source 112 and output power of the excitation light source 111. The controlling the ratio between the output power of the compensation light source 112 and the output power of the excitation light source 111 may be controlling a ratio between a light intensity of the compensation light source 112 and a light intensity of the excitation light source 111. For example, the change in light intensity may be realized by increasing or decreasing the current of the compensation light source 112 or the excitation light source 111. Since the compensation light source 112 and the excitation light source 111 are independently adjustable, the control device 14 can control the ratio between the compensation light and the excited light spectrally overlapping the compensation light to be any ratio.

Preferably, the control device 14 further includes a pulse width modulation (PWM) controller, and the PWM controller is used for controlling a luminous intensity of laser emitted by the cyan-green laser source and/or the red laser source. In this embodiment, during control of the luminous intensity of the laser emitted by the cyan-green laser source and/or the red laser source, the cyan-green laser source and/or the red laser source may be controlled to emit laser of different luminous intensities in different time periods. For example, when the cyan-green laser source is turned on when the segmented regions of the color wheel component provided with the green light wavelength conversion layer and the scattering layer is located in the output light path of the light source module, a luminous intensity of laser emitted by the cyan-green laser source when the segmented region of the color wheel component provided with the green light wavelength conversion layer is located in the output light path of the light source module and a luminous intensity of laser emitted by the cyan-green laser source when the segmented region of the color wheel component provided with the scattering layer is located in the output light path of the light source module may be controlled to be different.

Preferably, the control device 14 further includes a brightness control unit, and the brightness control unit is used for increasing or decreasing brightness of the compensation light and brightness of the excited light spectrally overlapping the compensation light equally. The specific implementation manner of increasing or decreasing brightness equally may be increasing or decreasing the current of the compensation light source 112 and the current of the excitation light source 111 by a equal ratio.

Embodiment 3

Figure 6:
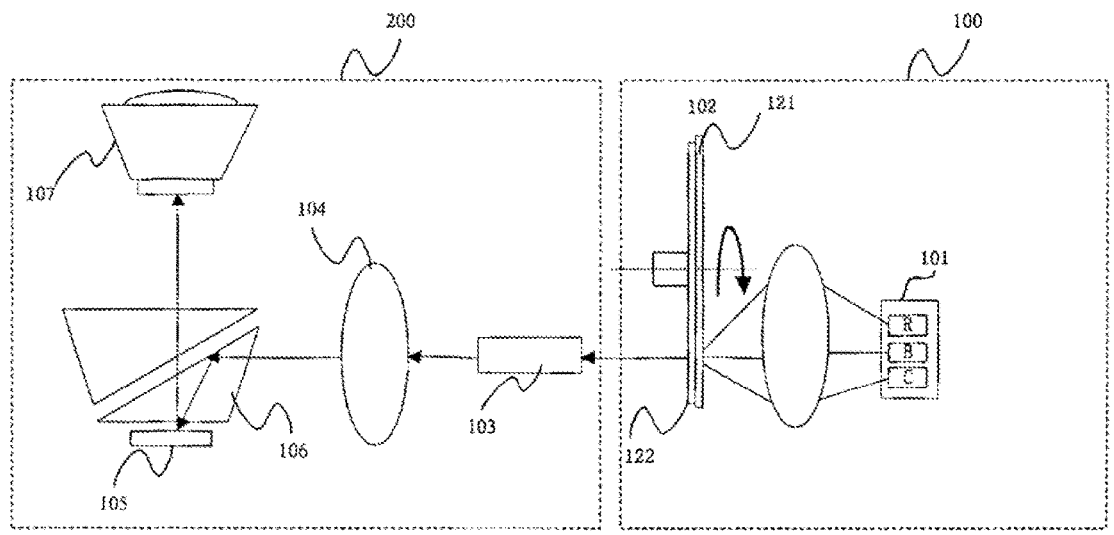
FIG. 6 is a schematic structural view of a single-chip DMD projection system provided in an embodiment of the present disclosure.

Referring to FIG. 6, FIG. 6 is a schematic structural view of a single-chip DMD projection system. The projection system includes a light emitting device 100 and an imaging component 200. The light emitting device 100 is any light emitting device in the aforementioned Embodiment 1 or Embodiment 2. Preferably, a color wheel component in the light emitting device 100 is the color wheel component shown in FIG. 2. Brief description is provided below, and reference is made to the aforementioned Embodiment 1 or Embodiment 2 for parts not detailed.

The light emitting device 100 includes a light source module 101, the light source module 101 generally adopts a semiconductor laser diode, and the light source module 101 includes an excitation light source and a compensation light source and may further include a third light source. The compensation light source includes a cyan-green laser source and/or a red laser source. A time period of cyan-green laser of the compensation light source is the same as a time period of blue light and green light emitted by the color wheel component 102, and a time period of the compensation light source emitting red light is the same as a time period of the color wheel component 102 emitting red light.

The excitation light source is a blue laser diode 112, and a dominant wavelength of blue laser emitted by the blue laser diode 112 is 445 nm. The cyan-green laser of the compensation light source is generated by a cyan-green laser diode 113, and the red laser of the compensation light source is generated by a red laser diode 111. A dominant wavelength of the cyan-green laser emitted by the cyan-green laser diode 113 is preferably any value between 510 nm and 530 nm including endpoint values, and a dominant wavelength of the red laser emitted by the red laser diode 111 is preferably any value between 625 nm and 645 nm including endpoint values. In this embodiment, preferably, the dominant wavelength of the cyan-green laser is 520 nm, and the dominant wavelength of the red laser is 638 nm.

In this embodiment, a compensation light source is added to compensate light of three primary colors RGB emitted by the color wheel component 102, wherein red laser is used for adjusting color coordinates of red light, and cyan-green laser is used for adjusting color coordinates of blue light and green light so that the color coordinates of the red light, the green light, and the blue light can be changed, and then a color gamut range of the projection system using the light emitting device can be changed.

In the embodiment, preferably, a DCI standard color gamut is used as the compensation standard, and the compensation light source is adjusted so that color gamuts of red light, green light, and blue light emitted by the color wheel component can be the same as or close to standard color gamuts of light of corresponding colors in the DCI standard color gamut to reduce the difference between the color gamut of the emitted light and the DCI standard color gamut, wherein the cyan-green laser diode 113 is used for compensating color gamuts of blue light and green light in light of three primary colors RGB, and the red laser diode 111 is used for compensating a color gamut of red light in the light of three primary colors RGB, so that compensated DCI color coordinates of the green light are (0.265±0.02, 0.69±0.02), compensated DCI color coordinates of the red light are (0.68±0.02, 0.32±0.02), and compensated DCI color coordinates of the blue light are (0.15±0.01, 0.06±0.01).

The color wheel component 102 includes a fluorescent wheel 121 and a filter wheel 122 rotating synchronously with the fluorescent wheel 121. Segmented regions of the fluorescent wheel 121 are shown in FIG. 2. The fluorescent wheel 121 is a color wheel having three color segments including a segmented region (referred to as a blue scattering region) 21 provided with a scattering layer, a segmented region (referred to as a green fluorescent region) 22 provided with a green light wavelength conversion layer, and a segmented region (referred to as a red fluorescent region) 23 provided with a red light wavelength conversion layer. The filter wheel 122 includes a green filter region disposed corresponding to the green fluorescent region 22 and a red filter region disposed corresponding to the red fluorescent region 23. The color wheel component 102 further includes a driving device, for example, a motor, for driving the fluorescent wheel 121 and the filter wheel 122 to rotate synchronously. A surface of the green fluorescent region 22 is provided with green fluorescent powder, a surface of the blue scattering region 21 is provided with scattering powder, a surface of the red fluorescent region 23 is provided with red fluorescent powder, and the function of the fluorescent powder is to convert light of a short wavelength into light of a long wavelength. The filter regions on the filter wheel 122 are generally filters. In this embodiment, blue laser passes through the rotating fluorescent wheel 121 to produce sequential light of three primary colors RGB, emitted blue light is light of narrow-band spectrum, which is the same as blue laser, while emitted red light and green light are light of broad-band spectrum. In order to improve color purity, the filter wheel 122 mainly filters the red light and the green light, the green filter is used for filtering out partial green light having wavelengths ranging from 460 nm to 490 nm and greater than 590 nm in the green light, wherein the wavelength range includes endpoint values, and the red filter is used for filtering out red light having wavelengths less than or equal to 600 nm.

Since the red light, green light, and blue light emitted by the color wheel component 102 are sequential, one DMD can be used to sequentially modulate the three kinds of light. Therefore, an imaging component having a single-chip DMD is preferably used in this embodiment. The imaging component includes a TIR prism 106, a DMD chip 105, and a projection lens 107. The TIR prism 106 is used for reflecting light emitted by the color wheel component 102 to the DMD chip 105 and reflecting imaging light emitted by the DMD chip 105 to the projection lens 107. The imaging component having the single-chip DMD is used for modulating various primary light emitted by the color wheel component 102 to form a color image. In other manners of implementation, an imaging component having a three-chip DMD may also be used, wherein one DMD separately modulates one kind of light in RGB. An imaging component having a two-chip DMD may also be used, wherein one DMD modulates one kind of light in RGB and the other DMD modulates the other two kinds of light in RGB.

In this embodiment, a dominant wavelength of blue laser of the blue laser diode 112 is 445 nm, the cyan-green laser diode 113 of the compensation light source emits cyan-green laser having a dominant wavelength of 520 nm, and the red laser diode 111 of the compensation light source emits red laser having a dominant wavelength of 638 nm. When the color wheel component 102 is in a time period of blue, the cyan-green laser diode 113 and the blue laser diode 112 are turned on, and blue laser and cyan-green laser pass through the blue scattering region 21 to produce mixed light of blue light and cyan-green laser. When the color wheel component 102 is in a time period of green, the cyan-green laser diode 113 and the blue laser diode 112 are turned on, and blue laser and cyan-green laser pass through the green fluorescent region 22 to produce mixed light of green light and cyan-green laser, which passes through the green filter for filtering. When the color wheel component 102 is in a time period of red, the red laser diode is turned on, and red laser passes through the red fluorescent region 23 to produce mixed light of red light and red laser, which passes through the red filter for filtering. Light emitted after filtering is homogenized through a square rod 103, then incident on the TIR prism 106 through a light relay system 104, and reflected to the DMD chip 105 for modulation, and passes through the projection lens 107 to finally output an image.

In this embodiment, the difference between a compensated color gamut of the system and a target standard color gamut can be within a set threshold range. Using the standard DCI color gamut as the target standard color gamut, color coordinates of tricolor light of the target standard color gamut are respectively green light (0.265, 0.69), red light (0.68, 0.32), and blue light (0.15, 0.06).

Figure 7:
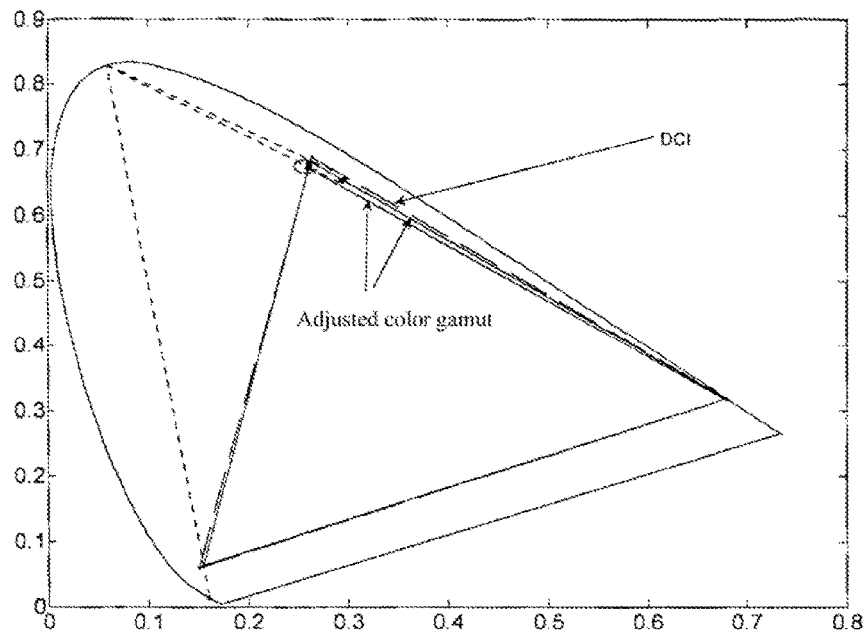
FIG. 7 is a diagram illustrating a color gamut of the projection system shown in FIG. 6 provided in the embodiment of the present disclosure.

As shown in FIG. 7, FIG. 7 is a diagram illustrating a color gamut of a projection system provided in the embodiment of the present disclosure. Blue light is mixed with cyan-green laser so that original color coordinates of the blue light can be changed, and color coordinates of the blue light after mixing are (0.15±0.01, 0.06±0.01), which are close to DCI standard color coordinates (0.15, 0.06) of blue light. Green light is mixed with cyan-green laser so that original color coordinates of the green light can be changed. The color coordinates are drawn along the boundary of a color coordinate distribution region thereof close to a place intersecting a side of a DCI color gamut triangle, thus forming a line segment from an upper vertex of a laser+phosphor color gamut triangle to an upper vertex of the DCI color gamut triangle, wherein the line segment is close to DCI standard color coordinates (0.265, 0.69) of green light; red light is mixed with red laser, and color coordinates of the red light obtained after mixing are (0.68±0.02, 0.32±0.02), achieving the effect of drawing, in a straight line, the color coordinates of the red light close to DCI standard color coordinates (0.68, 0.32) of red light.

In the present disclosure, the cyan-green laser diode 113 and/or the red light laser diode 111 is added to compensate a color gamut of light of three primary colors RGB emitted by the color wheel component 192, cyan-green laser is used for compensating color coordinates of blue light and color coordinates of green light, red laser is used for compensating color coordinates of red light, and original color coordinates are compensated to be close to DCI standard color coordinates so that the color gamut of each projector is compensated up to the DCI standard, and the color gamuts of the projectors are basically consistent, and since light input is increased, the color gamut range is enlarged and the brightness of a color image is improved.

The light emitting device further includes a PWM controller (pulse width modulation controller), and the PWM controller adjusts and controls, in automatic time period, a luminous intensity of emitted light of the cyan-green laser diode 113 and/or the red light laser diode 111 by means of pulse width modulation control.

In the embodiment of the present application, the color gamut range of the system can be adjusted by providing the compensation light source to compensate light of corresponding colors. As described above, the DCI standard color gamut may be used as the compensation standard for adjustment to correct the color gamut of the projection system.

It can be known from the above description that the projection system in the embodiment of the present application emits sequential red light, green light, and blue light in the color wheel component. A time period of the compensation light source is set so that a time period of cyan-green laser of the compensation light source is the same as a time period of blue light and green light emitted by the color wheel component, and a time period of red laser of the compensation light source is the same as a time period of red light emitted by the color wheel component. Thus, the blue light and the green light can be compensated through the cyan-green laser, and the red light can be compensated through the red laser so as to adjust the color gamut of the projection system to a set range.

Embodiment 4

Figure 8:
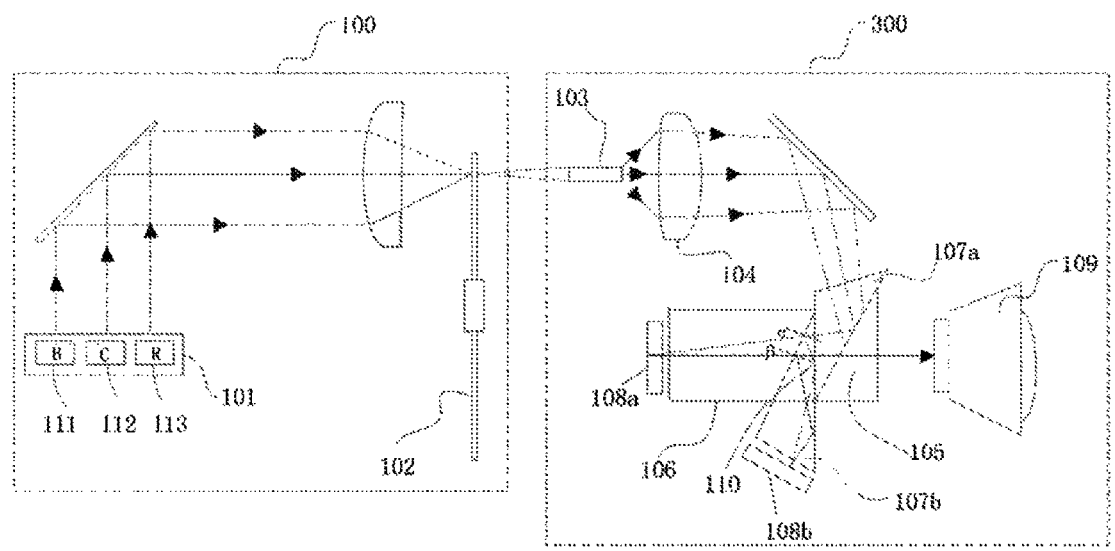
FIG. 8 is a schematic structural view of a two-chip DMD projection system provided in an embodiment of the present disclosure.

Referring to FIG. 8, FIG. 8 is a schematic structural view of a two-chip DMD projection system. The projection system includes a light emitting device 100 and a light splitting device 300 having two DMD chips.

The light emitting device 100 includes a light source module 101 and a color wheel component 102. The light source module 101 includes an excitation light source 1111 and a compensation light source, and the compensation light source includes a cyan-green laser diode 112 and a red laser diode 113.

The color wheel component 102 includes a fluorescent wheel. The distribution of segmented regions on the fluorescent wheel is shown in the aforementioned FIG. 3. The fluorescent wheel includes a segmented region (also referred to as a yellow fluorescent region) 1024 provided with a yellow light wavelength conversion layer and a segmented region (also referred to as a blue light scattering region) 1025 provided with a scattering layer. The color wheel component 102 emits sequential blue light and yellow light under excitation of the excitation light source 1111, wherein the blue light scattering region 1021 has scattering powder for scattering and emitting incident light, for example, converting blue laser in a polarized state into blue light in a non-polarized state. The yellow fluorescent region 1022 has yellow fluorescent powder, and the function of the fluorescent powder is to convert light of a short wavelength into light of a long wavelength. Therefore, blue laser emitted by the excitation light source excites the yellow fluorescent powder to obtain yellow fluorescence light. The color wheel component 102 further has a driving device, for example, a motor, for driving the fluorescent wheel to rotate. The light splitting device having the two-chip DMD is used for splitting the blue light and the yellow light emitted by the color wheel component 102 to form light of three primary colors RGB, and distributing and modulating the light of three primary colors RGB to form a color image.

In this embodiment, a DCI standard color gamut may be used as the compensation standard. At this time, the compensation light source is used for reducing the difference between the color gamut of emitted light and the DCI standard color gamut, and the compensation light source includes the cyan-green laser diode and/or the red laser diode.

In this embodiment, cyan-green laser 112 of the compensation light source is generated by the cyan-green laser diode, red laser 113 of the compensation light source is generated by the red laser diode, and the excitation light source 1111 is a blue laser diode. A dominant wavelength of blue laser emitted by the blue laser diode is 445 nm, a dominant wavelength of the cyan-green laser emitted by the cyan-green laser diode is any value between 510 nm and 530 nm including endpoint values, and a dominant wavelength of the red laser emitted by the red laser diode is any value between 625 nm and 645 nm including endpoint values. Preferably, the dominant wavelength of the cyan-green laser is 520 nm, and the dominant wavelength of the red laser is 638 nm.

The cyan-green laser 112 of the compensation light source is turned on in the entire time period of the color wheel component 102, that is, the cyan-green laser diode is turned on when the color wheel component 102 emits yellow light and blue light. A time period of the red laser 113 of the compensation light source is the same as a time period of the yellow light emitted by the color wheel component 102, that is, the red laser diode is turned on only when the color wheel component 102 emits yellow light.

In this embodiment, the compensation light source includes the cyan-green laser diode and/or the red laser diode, a dominant wavelength of blue laser emitted by the excitation light source is preferably 445 nm, a dominant wavelength of cyan-green laser emitted by the cyan-green laser diode is preferably 520 nm, and a dominant wavelength of red laser emitted by the red laser diode is preferably 638 nm. In a time period of yellow and a time period of blue, the cyan-green laser diode and the excitation light source 1111 are turned on for compensating color gamuts of blue light and green light in light of three primary colors RGB of the light splitting device. In the time period of yellow, the red laser diode is turned on for compensating a color gamut of red light in the light of three primary colors RGB. Compensated color gamuts of red light, green light, and blue light can be within set ranges by setting color gamuts of the red laser diode and the cyan-green laser diode.

In this embodiment, the difference between a compensated color gamut of the system and a target standard color gamut can be within a set threshold range. Using the standard DCI color gamut as the target standard color gamut, color coordinates of tricolor light of the target standard color gamut are respectively green light (0.265, 0.69), red light (0.68, 0.32), and blue light (0.15, 0.06). Compensated DCI color coordinates of the green light can be (0.265±0.02, 0.69±0.02), compensated DCI color coordinates of the red light can be (0.68±0.02, 0.32±0.02), and compensated DCI color coordinates of the blue light can be (0.15±0.01, 0.06±0.01). Light emitted by the light emitting device 100 is converged by a collecting lens 101 and then incident on the color wheel component 102, and passes through the color wheel component 102 to emit sequential yellow light and blue light, the light emitted by the color wheel component 102 enters a square rod 103 for homogenization, and afterwards sequentially passes through a light relay system 104 and a TIR prism 105 and enters a light splitting and combining prism 106. The light splitting and combining prism 106 splits the light to form light of three primary colors RGB, and distributes the light of three primary colors RGB to different DMD chips for modulation, and the light of three primary colors RGB is combined and then passes through a projection lens to form a color image.

Further, the light emitting device 100 further includes a PWM controller (pulse width modulation controller), and the PWM controller is used for controlling a luminous intensity of emitted light of the cyan-green laser diode and/or the red light laser diode. The PWM adjusts, in time period, the luminous intensity of the emitted light of the cyan-green laser diode and/or the red light laser diode by means of pulse width modulation control. Since cyan-green laser of different intensities may be required when compensating blue light and green light, intensities of cyan-green laser and red laser required need to be calculated according to existing color coordinates of green light and red light and the DCI standard color coordinates, and therefore, the intensities of the cyan-green laser and the red laser need to be adjusted in time period, and meanwhile, segments of the color wheel component 102 need to be adjusted.

The light splitting device 300 having two DMD chips includes the light splitting and combining prism 106, the TIR prism 105, a first DMD chip 108a, a second DMD chip 108b, and a projection lens 109. The TIR prism 105 is used for reflecting yellow light and blue light emitted by the color wheel component 102 to the light splitting and combining prism 106, the light splitting and combining prism 106 is used for splitting the yellow light and the blue light emitted by the color wheel component 102 to form light of three primary colors RGB and distributing the light of three primary colors RGB to the first DMD chip 108a and the second DMD chip 108b for modulation, and combining and reflecting the modulated light of three primary colors RGB to the projection lens 109. The light splitting and combining prism 106 specifically includes a first prism 107a and a second prism 107b, and a light splitting film 110 is provided between the first prism 107a and the second prism 107b.

The light splitting film 110 between the first prism 107a and the second prism 107b in the light splitting and combining prism 106 splits light, and when the light splitting film 110 is a low-pass light splitting film, light distributed to the first DMD chip 108a is blue light and green light in the light of three primary colors RGB, and light distributed to the second DMD chip 108b is red light in the light of three primary colors RGB.

Since the blue light and the yellow light emitted by the color wheel component 102 have different time periods, the blue light can be modulated using a light path of red light or green light. Therefore, in the time period in which the color wheel component 102 emits blue light, the blue light and the cyan-green laser may be modulated through the first light path. Or, in the time period in which the color wheel component emits blue light, the blue light and the cyan-green laser are modulated through the second light path.

Figure 9:
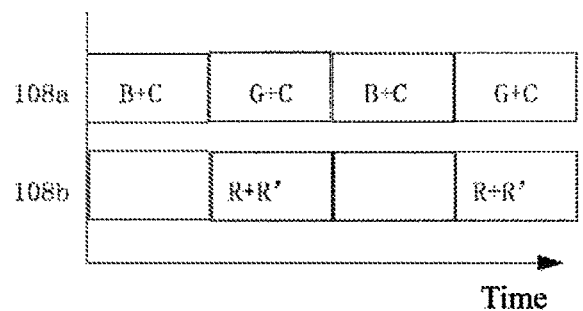
FIG. 9 is a sequence diagram of a first DMD chip 108a and a sequence diagram of a second DMD chip 108b when using a low-pass light splitting film provided in an embodiment of the present disclosure.
Figure 10:
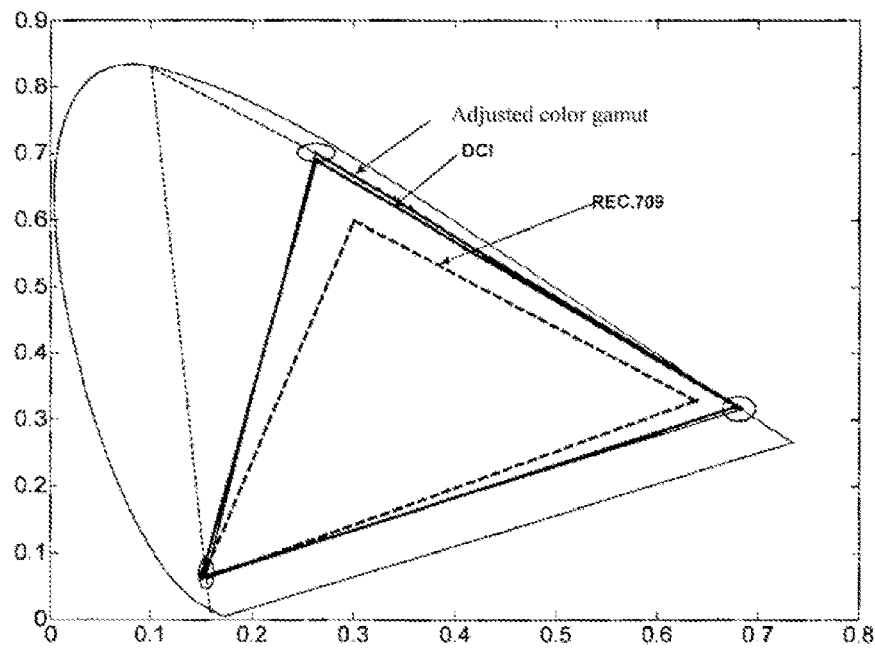
FIG. 10 is a diagram illustrating a color gamut of the projection system shown in FIG. 8 provided in the embodiment of the present disclosure.

When the blue light and the cyan-green laser are modulated through the first light path in the time period in which the color wheel component 102 emits the blue light, a sequence diagram of the first DMD chip 108a and a sequence diagram of the second DMD chip 108b are shown in FIG. 9. Since the function of the low-pass light splitting film is to transmit light of a short wavelength and reflect light of a long wavelength, when yellow light and blue light B having different time periods emitted by the color wheel component 102 are incident on the low-pass light splitting film, the low-pass light splitting film transmits the blue light, green light G in the yellow light, and cyan-green laser C to the first DMD chip 108a and reflects red light R in the yellow light and red laser R' to the second DMD chip 108b, the cyan-green laser C is mixed with the blue light B so that original color coordinates of the blue light can be changed and drawn close to DCI standard color coordinates (0.15, 0.06) of blue light. Since the green light is split from the yellow light, the long wavelength part of the green light is filtered out, different projection systems differ in the process of filtering out long wavelengths of green light, and such difference causes color coordinates of the green light to move along an edge of a color gamut of the green light in an approximately straight line, and the cyan-green laser C is mixed with the green G so that original color coordinates of the green light can be changed and drawn close to DCI standard color coordinates (0.265, 0.69) of green light in the aforementioned straight line. Similarly, since the red light R is split from the yellow light, the short wavelength part of the red light is filtered out, different projection systems differ in the process of filtering out short wavelengths of red light, and such difference causes color coordinates of the red light to move along an edge of a color gamut of the red light in an approximately straight line, and the red light R is mixed with the red laser R' so that original color coordinates of the red light can be changed and drawn close to DCI standard color coordinates (0.68, 0.32) of red light in the aforementioned straight line. A diagram illustrating a color gamut thereof is shown in FIG. 10.

It should be noted that in this embodiment, the method may be applied to a two-chip LCOS (Liquid Crystal On Silicon) projection system, and blue light is distributed to two LCOSs according to polarized states so that energy on the two LCOSs can be more equalized, facilitating heat dissipation.

In other implementation manners, it may also be set that in a time period in which the color wheel component 102 emits blue light, the first light path is used for distributing the blue light, the second light path is used for distributing the cyan-green laser, and the blue light and the cyan-green laser are simultaneously modulated through the first light path and the second light path. Or in a time period in which the color wheel component 102 emits blue light, the second light path is used for distributing the blue light, the first light path is used for distributing the cyan-green laser, and the blue light and the cyan-green laser are simultaneously modulated through the first light path and the second light path.

Figure 11:
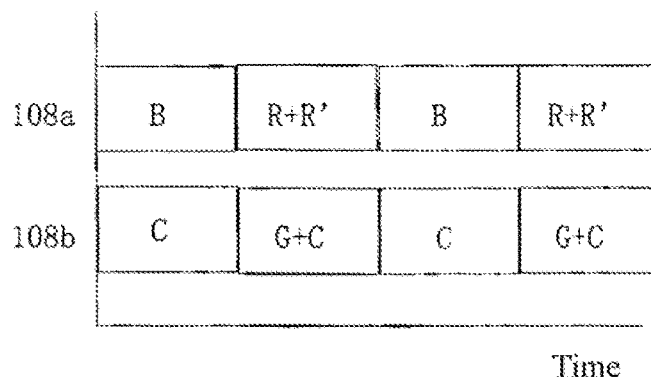
FIG. 11 is a sequence diagram of the first DMD chip 108a and a sequence diagram of the second DMD chip 108b when using a band-pass light splitting film provided in an embodiment of the present disclosure.

When the light splitting film 110 is a band-pass light splitting film, a sequence diagram of the first DMD and a sequence diagram of the second DMD are shown in FIG. 11, light distributed to the first DMD chip 108a is blue light B and red light R in the light of three primary colors RGB, and light distributed to the second DMD chip 108b is green light G in the light of three primary colors RGB. In this embodiment, the function of the band-pass light splitting film is to transmit required light and reflect non-required light. When yellow light and blue light B emitted by the color wheel component 102 are incident on the band-pass light splitting film, the blue light B, red light R split from the yellow light, and red laser R' are transmitted to the first DMD chip 108a, cyan-green laser C and green light G split from the yellow light are reflected to the second DMD chip 108b, and the cyan-green laser C compensating the blue light and the blue light B are distributed to different DMD chips.

Figure 12:
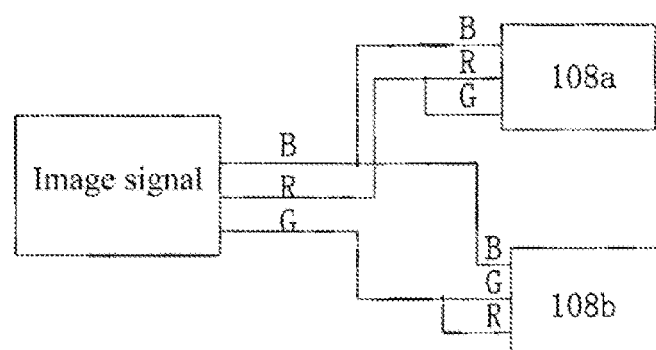
FIG. 12 is a diagram illustrating image signal connection of the first DMD chip 108a and the second DMD chip 108b when using the band-pass light splitting film provided in the embodiment of the present disclosure.

Since the cyan-green laser C and the blue light B have greater energy, distributing them to different DMD chips facilitates heat dissipation of each DMD chip. Each DMD chip processes light in a time period as that for a single-chip DMD. Therefore, as shown in FIG. 12, a blue light signal input end of the first DMD chip 108a and a blue light signal input end of the second DMD chip 108b need to be connected together. Meanwhile, the PWM controller is used for modulating the intensity of cyan-green laser so that color coordinates of the blue light can be compensated, red light is mixed with red laser so that original color coordinates of the red light can be changed and compensated to be close to DCI standard color coordinates of the red color, and cyan-green laser is mixed with green light so that original color coordinates of the green light can be changed and compensated to be close to DCI standard color coordinates of the green color, thereby reducing the difference between a color gamut of light of three primary colors and a DCI standard color gamut.

The aforementioned projection system is described using two light splitting light paths as an example, and it may also be set that the light splitting device includes a third light path in other implementation manners. In the time period in which the color wheel component emits blue light, the third light path is used for modulating the blue light and the cyan-green laser. The third light path has a third DMD chip.

Embodiment 5

Figure 13:
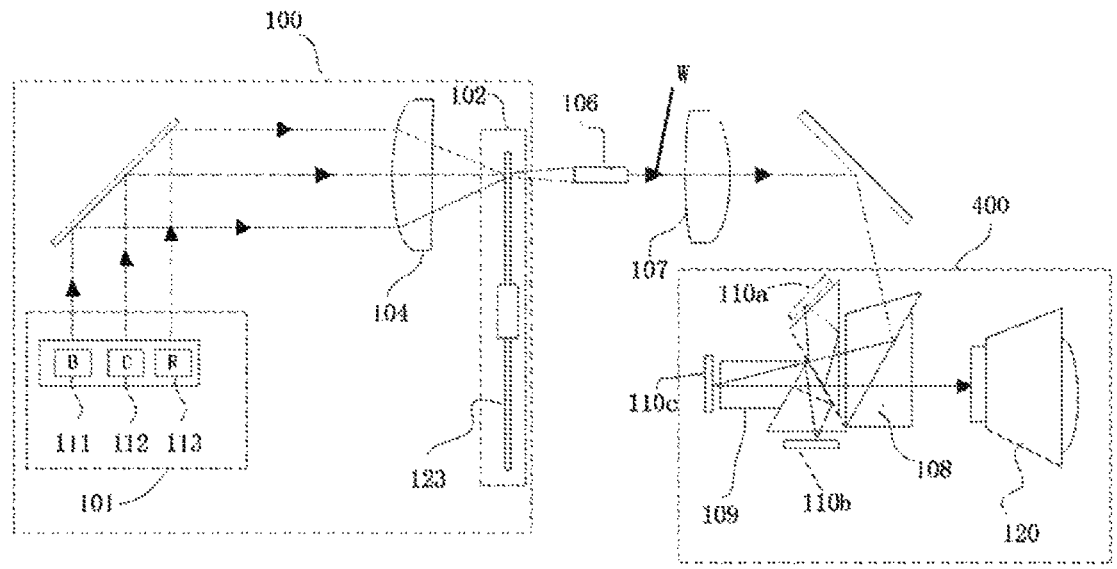
FIG. 13 is a schematic structural view of a three-chip DMD projection system provided in an embodiment of the present disclosure.

FIG. 13 is a schematic structural view of a three-chip DMD projection system. The projection system includes a light emitting device 100 and a light splitting device 400. The light splitting device 400 is different from the light splitting device 300 in the aforementioned Embodiment 4, and detailed description is as follows: the light splitting device 400 includes a first light path having a first DMD chip 110a, a second light path having a second DMD chip 110b, and a third light path having a third DMD chip 110c.

The light emitting device 100 includes a light source module 101 and a color wheel component 102. The light source module 101 includes an excitation light source and a compensation light source. The compensation light source includes cyan-green laser and/or red laser. The light source module 101 is turned on in the entire time period, that is, the excitation light source, the cyan-green laser, and the red laser included in the light source module 101 are continuously turned on in the entire projection time period.

The excitation light source includes a first blue laser diode 111. The cyan-green laser of the compensation light source is generated by a cyan-green laser diode 112, and the red laser of the compensation light source is generated by a red laser diode 113.

The color wheel component 102 emits white light W under excitation of the excitation light source in the entire time period. The color wheel component 102 includes an all-yellow color wheel 123. The all-yellow color wheel 123 emits yellow light under excitation of the first blue laser diode 111 and transmits part of blue light of the first blue laser diode, and the emitted yellow light and the transmitted blue light form white light W for emission.

The light splitting device 400 distributes blue light in the white light W to the first light path for modulation. At this time, since the blue light distributed to the first light path is part of blue laser transmitted by the all-yellow color wheel 123 and is remaining light after exciting yellow fluorescent powder, having an uncertain color gamut range, cyan light in part of yellow light may be distributed to the first light path for simultaneous modulation with the blue light, the blue light and the cyan light are simultaneously modulated through the first DMD chip 110a, and the blue light is compensated with the cyan light to adjust the color gamut range of the blue light.

The light splitting device 400 distributes red light in the white light W and the red laser to the second light path for modulation, the red light and the red laser are simultaneously modulated through the second DMD chip 110b, and the red light is compensated with the red laser to adjust a color gamut range of the red light.

The light splitting device 400 distributes green light in the white light W and the cyan-green laser to the third light path for modulation, the green light and the cyan-green laser are simultaneously modulated through the third DMD chip 110c, and the green light is compensated with the cyan-green laser to adjust a color gamut range of the green light.

It can be known from the above description that in the projection system, the light splitting device is used and the compensation light source may be used to compensate corresponding split light of light of three primary colors after splitting so as to adjust a color gamut range of the projection system.

In this embodiment, the compensation light source includes the cyan-green laser diode 112 and/or the red laser diode 113, the cyan-green laser diode 112 is used for compensating a color gamut of green light, and the red laser diode 113 is used for compensating a color gamut of red light. Preferably, a wavelength of blue laser emitted by the first blue laser diode 111 is 445 nm, a wavelength of cyan-green laser emitted by the cyan-green laser diode 112 ranges from 510 nm to 530 nm including endpoint values, and a wavelength of red laser emitted by the red laser diode 113 ranges from 625 nm to 645 nm including endpoint values.

The difference between a compensated color gamut of the system and a target standard color gamut can be within a set threshold range. Using a standard DCI color gamut as the target standard color gamut, color coordinates of tricolor light of the target standard color gamut are respectively green light (0.265, 0.69), red light (0.68, 0.32), and blue light (0.15, 0.06). In this embodiment, the DCI standard color gamut may be used as the standard for color gamut adjustment so that color gamuts of the red light, the green light, and the blue light after compensation can be the same as or close to color gamuts of light of corresponding colors in the DCI standard color gamut. In this solution, compensated DCI color coordinates of the green light are (0.265±0.02, 0.69±0.02), compensated DCI color coordinates of the red light are (0.68±0.02, 0.32±0.02), and compensated DCI color coordinates of the blue light are (0.15±0.01, 0.06±0.01). The all-yellow color wheel 123 is shown in FIG. 4 and includes a yellow light wavelength conversion layer disposed throughout a circumferential direction of the all-yellow color wheel 123. The yellow light wavelength conversion layer contains yellow fluorescent powder for emitting white light according to light emitted by the compensation light source and the first blue laser diode 111. The function of the fluorescent powder is to convert light of a short wavelength into light of a long wavelength.

In this embodiment, the compensation light source includes the cyan-green laser diode 112 and/or the red laser diode 113, a dominant wavelength of blue laser emitted by the first blue laser diode 111 is preferably 445 nm, a dominant wavelength of cyan-green laser emitted by the cyan-green laser diode 112 is preferably 520 nm, and a dominant wavelength of red laser emitted by the red laser diode 113 is preferably 638 nm. The first blue laser diode 111, the cyan-green laser diode 112, and the red laser diode 113 are all turned on in the entire time period for compensating color gamuts of light of corresponding colors in light of three primary colors RGB.

Light emitted by the light source module 101 is converged by a first collecting lens 104 and then incident on the all-yellow color wheel 123, the first blue laser diode 111 and the cyan-green laser diode 112 excite the yellow fluorescent powder on the all-yellow color wheel 123 to emit yellow light, part of blue laser and yellow light transmitting through the all-yellow color wheel 123 form white light for emission by the all-yellow color wheel 123, and the white light emitted by the all-yellow color wheel 123 enters a square rod 106 for homogenization and then is emitted as white light W. The white light W passes through a light relay system 107 and is incident on a TIR prism 108 and a light splitting and combining prism 109, the light splitting and combining prism 109 splits the white light W to form light of three primary colors RGB, and distributes the light of three primary colors RGB to three different DMD chips for modulation, and the light of three primary colors RGB is combined and then passes through a projection lens 120 to form a color image.

Figure 14:
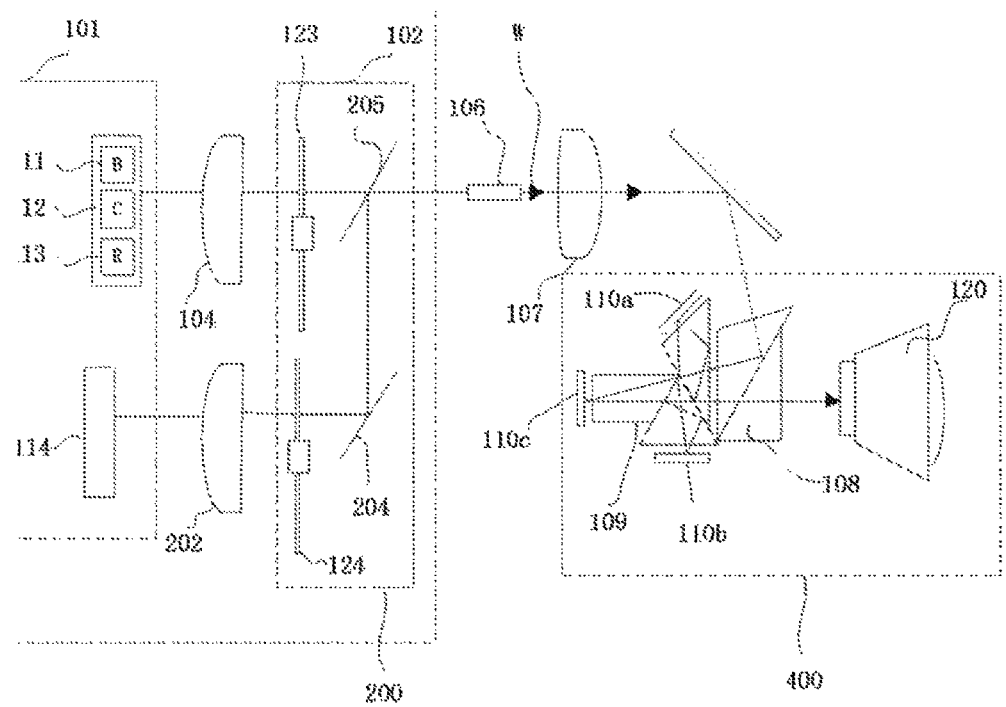
FIG. 14 is a schematic structural view of a three-chip DMD projection system provided in another embodiment of the present disclosure.

As shown in FIG. 14, on the basis of the projection system provided in the aforementioned embodiment, the excitation light source further includes a second blue laser diode 114, and the color wheel component 102 further includes an all-blue color wheel 124. The projection system further includes a reflecting mirror 204 and a dichroic mirror 205. The all-blue color wheel 124 performs scattering and decoherence on blue light emitted by the second blue laser diode 114. The dichroic mirror 205 is used for filtering blue light in the white light emitted by the all-yellow color wheel 123 so that the yellow light emitted by the all-yellow color wheel 123 and standard blue light emitted by the all-blue color wheel 124 form white light for emission. At this time, since the blue light in the emitted white light W is standard blue light emitted by the all-blue color wheel 124, and does not need to be compensated in subsequent splitting, the light splitting device 400 only distributes the standard blue light emitted by the all-blue color wheel 124 to the first light path for modulation, without requiring cyan light compensation.

Figure 15:
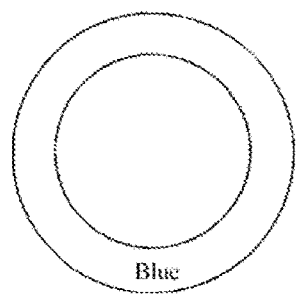
FIG. 15 is a diagram illustrating a distribution example of a segmented region of an all-blue color wheel provided in an embodiment of the present disclosure.

A dominant wavelength of blue laser emitted by the second blue laser diode 114 is preferably 462 nm. The all-blue color wheel 124 is shown in FIG. 15. The all-blue color wheel 124 is provided with a scattering layer throughout a circumferential direction thereof. The scattering layer contains scattering powder for scattering and emitting incident light, for example, the function of the scattering powder is to convert blue light in a polarized state into blue light in a non-polarized state. Therefore, the second blue laser diode 114 emits blue light through the all-blue color wheel 124. The reflecting mirror 204 is used for reflecting the blue light emitted by the all-blue color wheel 203 to the dichroic mirror 205, and the dichroic mirror 205 is used for transmitting green light and red light in the white light emitted by the all-yellow color wheel 123, and reflecting the blue light emitted by the all-blue color wheel 124 to form white light W so that the transmitted green light and red light and the reflected blue light are incident on the light splitting device 400.

In this embodiment, the first blue laser diode 111, the cyan-green laser diode 112, and the red laser diode 113 in the light emitting device 100 are all turned on in the entire time period, and the second blue laser diode 114 is turned on at the same moment, for compensating color gamuts of the split blue light, green light, and red light. Light emitted by the light emitting device 100 is converged by the first collecting lens 104 and then incident on the all-yellow color wheel 123. White light emitted through the all-yellow color wheel 123 is incident on a surface of the dichroic mirror 205. Light emitted by the second blue laser diode 114 is converged by a second collecting lens 202 and then incident on the all-blue color wheel 124. Blue light emitted through the all-blue color wheel 124 is incident on a surface of the reflecting mirror 204, and the reflecting mirror 204 reflects the blue light to the surface of the dichroic mirror 205. The blue light is mixed with green light and red light transmitted by the dichroic mirror 205 to form white light, the white light enters the square rod 106 for homogenization, and afterwards sequentially passes through the relay system 107 and the TIR prism 108 and enters the light splitting and combining prism 109. The light splitting and combining prism 109 splits the white light to form light of three primary colors RGB, and distributes the light of three primary colors RGB to three different DMD chips for modulation. The light of three primary colors RGB is combined and then passes through the projection lens 120 to form a color image.

The light splitting device 400 includes the TIR prism 108, the light splitting and combining prism 109, the first DMD chip 110*a*, the second DMD chip 110*b*, the third DMD chip 110*c*, and the projection lens 120. The TIR prism 108 is used for reflecting white light emitted by the all-yellow color wheel 123 or white light emitted by the dichroic mirror to the light splitting and combining prism 109, and the light splitting and combining prism 109 is used for splitting the white light to form light of three primary colors RGB and distributing the light of three primary colors RGB to the first DMD chip 110*a*, the second DMD chip 110*b*, and the third DMD chip 110*c* for modulation, and combining and reflecting the modulated light of three primary colors RGB to the projection lens 120. The light splitting and combining prism 109 specifically includes a first prism, a second prism, and a third prism. A first light splitting film is provided between the first prism and the second prism, and a second light splitting film is provided between the second prism and the third prism. The first light splitting film is used for distributing blue light in the light of three primary colors RGB to the first DMD chip 110*a*, and the second light splitting film is used for distributing red light and green light in the light of three primary colors RGB to the second DMD chip 110*b* and the third DMD chip 110*c* respectively.

In the implementation manner shown in FIG. 13, in the entire time period, the first blue laser diode 111, the cyan-green laser diode 112, and the red laser diode 113 are all turned on, white light emitted by the all-yellow color wheel 123 is homogenized through the square rod, incident on the TIR prism 108 through the light relay system 107, and reflected by the TIR prism 108 to a surface of the first light splitting film of the light splitting and combining prism 109. The first light splitting film reflects blue light and cyan light in part of yellow light to the first DMD chip 110*a* for modulation, and transmits yellow light to a surface of the second light splitting film. Red light in the yellow light and red laser are reflected on the surface of the second light splitting film to the second DMD chip 110*b*, and cyan-green laser and green light in the yellow light are transmitted on the surface of the second light splitting film to the third DMD chip 110*c* for modulation. Light modulated by the DMDs are combined and emitted at the first light splitting film and the second light splitting film, reaches the projection lens 120, and finally forms a color image. The blue light is mixed with the cyan light in the yellow light so that original color coordinates of the blue light can be changed. Since the cyan light is intercepted from the yellow light, the long wavelength part of the cyan light is filtered out. Moreover, due to the coating difference of the first light splitting film or the assembly difference of the light splitting and combining prism 109 between different projection systems, cyan light passing through the first light splitting film varies in wavelength range. Therefore, color coordinates of blue light obtained after the blue light is mixed with the varying cyan light are a small color gamut range that is close to DCI standard color coordinates (0.15, 0.06) of blue light.

Figure 16:
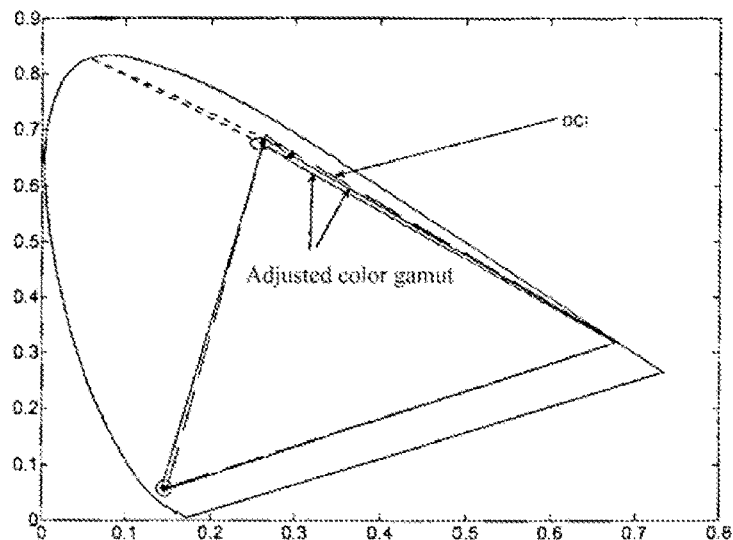
FIG. 16 is a diagram illustrating a color gamut of the projection system shown in FIG. 13 provided in the embodiment of the present disclosure.

The cyan-green laser is mixed with the green light in the yellow light so that original color coordinates of the green light can be changed, since the green light is intercepted from the yellow light, the short wavelength part and long wavelength part thereof are both filtered out, moreover, due to the coating difference of the second light splitting film, compensated color coordinates of the green light are a small color gamut range (0.265±0.02, 0.69±0.02) that is close to DCI standard color coordinates (0.265, 0.69) of green light. The red light is mixed with the red laser so that color coordinates of the red light can be drawn to (0.68±0.02, 0.32±0.02) in a straight line, which is close to DCI standard color coordinates (0.68, 0.32) of red light. The color gamut thereof is shown in FIG. 16.

In this embodiment, a compensation light source is added to compensate a color gamut range, cyan light in yellow fluorescence light is used for compensating color coordinates of blue light, 520 nm cyan-green laser is used for compensating color coordinates of green light, and 638 nm red laser is used for compensating color coordinates of red light. In the process of compensating color coordinates of blue light, since the ratio between blue light not converted into yellow light and yellow light is definite, a wavelength range of required cyan light needs to be calculated according to the ratio between the blue light and the cyan light intercepted from the yellow light. For compensation of color coordinates of red light, 638 nm red laser can desirably compensate the color coordinates of the red light to (0.68±0.02, 0.32±0.02), very close to DCI standard color coordinates (0.68, 0.32) of red light.

Figure 17:
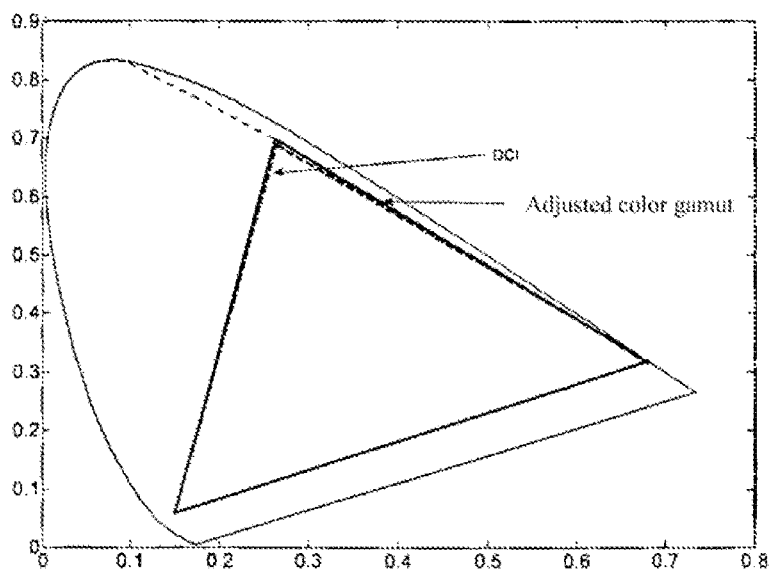
FIG. 17 is a diagram illustrating a color gamut of the projection system shown in FIG. 14 provided in the embodiment of the present disclosure.

In the implementation manner shown in FIG. 14, the first blue laser diode 111, the cyan-green laser diode 112, and the red laser diode 113 in the light emitting device 100 are all turned on in the entire time period, and the second blue laser diode 114 is turned on at the same moment, for compensating color gamuts of blue light, green light, and red light in light of three primary colors RGB. White light emitted from the dichroic mirror 205 enters the square rod 106 for homogenization, and afterwards sequentially passes through the light relay system 107 and the TIR prism 108 and enters the light splitting and combining prism 109. The TIR prism 108 reflects the white light to the surface of the first light splitting film in the light splitting and combining prism 109. The first light splitting film reflects blue light to the first DMD chip 110a for modulation, and transmits yellow light to the surface of the second light splitting film. The second light splitting film reflects red laser and red light split from the yellow light to the second DMD chip 110b for modulation, and transmits green light in the yellow light to the third DMD chip 110c for modulation. Light modulated by the DMDs are combined and emitted at the first light splitting film and the second light splitting film, reaches the projection lens 120, and finally forms a color image. Color coordinates (0.15±0.01, 0.06±0.01) of 462 nm blue light, as blue light in the projection system, are close to DCI standard color coordinates (0.15, 0.06) of blue light so the blue light does not need to be compensated. 520 nm cyan-green laser is mixed with green light split from yellow light, and due to the difference of the green light in the process of filtering out long wavelengths thereof, color coordinates of the green light are a segment of straight line along an edge of a color gamut of the green light, and color coordinates after being compensated by the 520 nm cyan-green laser are (0.265±0.02, 0.69±0.02), close to DCI color coordinates (0.265, 0.69) of green light. 638 nm red laser is mixed with red light split from yellow light, and due to the difference of the red light in the process of filtering out short wavelengths thereof, color coordinates of the red light are a segment of straight line along an edge of a color gamut of the red light, and color coordinates after being compensated by the 638 nm red laser are (0.68±0.02, 0.32±0.02), close to DCI standard color coordinates (0.68, 0.32) of red light. Therefore, the color coordinates of the blue light, green light, and red light all can be desirably compensated. A color gamut thereof is shown in FIG. 17.

In FIG. 14, two excitation light sources including the first blue laser diode 111 and the second blue laser diode 114 are used, color coordinates of 462 nm blue laser in the second blue laser diode 114, as blue light of the projection system, can meet the color gamut standard, 445 nm blue laser in the light emitting device 100 is used for exciting yellow fluorescent powder to produce yellow light that is split into green light and red light, 520 nm cyan-green laser is used for compensating green light, and 638 nm red laser is used for compensating red light, which all can be compensated to be close to a DCI standard color gamut.

It can be known from the above description that the projection system in the embodiment of the present application can adjust a color gamut range through the compensation light source so that the color gamut range of the projection system can be set. As described above, a standard DCI color gamut can be used as the compensation standard so that the color gamut range of the projection system is the same as or close to the standard DCI color gamut.

The above descriptions are only preferred embodiments of the present disclosure and do not limit the scope of the present disclosure. Any equivalent structures made according to the specification and drawings of the present disclosure, or direct or indirect application to other related technical fields, shall be regarded as falling within the scope of the present disclosure.

The invention claimed is:
1. A light emitting device, comprising:
a light source module comprising an excitation light source for emitting exciting light and a compensation light source for emitting compensation light; and
a color wheel component comprising at least one segmented region distributed in a motion direction of the color wheel component, wherein the color wheel component emits the compensation light and first light that comprises at least one beam of excited light under irradiation of the excitation light source and the compensation light source,
wherein the compensation light spectrally overlaps the at least one beam of excited light in the first light, the compensation light is emitted in a time period in which the excited light spectrally overlapping the compensation light is emitted, the compensation light and the excited light spectrally overlapping the compensation light are simultaneously emitted, and the compensation light and the excited light spectrally overlapping the compensation light are independently adjustable.
2. The light emitting device according to claim 1, wherein a time sequence of the compensation light emitted by the compensation light source is the same as a time sequence of the excited light emitted by the color wheel component under irradiation of the excitation light source and spectrally overlapping the compensation light; and
wherein at least one segmented region in the at least one segmented region is provided with a wavelength conversion layer, and the wavelength conversion layer absorbs the exciting light and is capable of emitting the excited light.

3. The light emitting device according to claim 2, wherein the compensation light source is turned on when the excitation light source irradiates the segmented region of the color wheel component provided with the wavelength conversion layer that absorbs the exciting light and is capable of emitting the excited light spectrally overlapping the compensation light, and turned off when the excitation light source irradiates remaining segmented regions.

4. The light emitting device according to claim 2, wherein at least one segmented region not provided with a wavelength conversion layer in the at least one segmented region is provided with a scattering layer, and the scattering layer scatters and emits the exciting light emitted by the excitation light source.

5. The light emitting device according to claim 4, wherein the compensation light source is turned on when the excitation light source irradiates the segmented region provided with the wavelength conversion layer that absorbs the exciting light and is capable of emitting the excited light and the segmented region provided with the scattering layer of the color wheel component, and turned off when the excitation light source irradiates remaining segmented regions.

6. The light emitting device according to claim 5, wherein the excitation light source is turned on in all the segmented regions of the color wheel component, or
    the light source module further comprises a third light source for emitting third light, the third light and the exciting light are light of the same color and different spectra, the excitation light source is turned on in the segmented region of the color wheel component provided with the wavelength conversion layer and turned off in other segmented regions, and the third light source is turned on in the segmented region of the color wheel component provided with the scattering layer and turned off in other segmented regions.

7. The light emitting device according to claim 1, wherein the compensation light source comprises a red laser source for emitting red light and/or a cyan-green laser source for emitting cyan-green light, and the excitation light source is a blue laser source for emitting blue light.

8. The light emitting device according to claim 7, wherein the light emitting device further comprises:
    a control device for controlling a ratio between the compensation light and the excited light spectrally overlapping the compensation light by controlling output power of the compensation light source and output power of the excitation light source.

9. The light emitting device according to claim 8, wherein the control device further comprises:
    a brightness control unit for increasing or decreasing brightness of the compensation light and brightness of the excited light spectrally overlapping the compensation light equally; and/or
    a PWM controller for controlling a luminous intensity of laser emitted by the cyan-green laser source and/or the red laser source.

10. The light emitting device according to claim 1, wherein the color wheel component emits sequential red light, green light, and blue light under irradiation of the excitation light source; and
    the compensation light source comprises cyan-green laser and/or red laser, a time sequence of the cyan-green laser of the compensation light source is the same as a time sequence of the blue light and the green light emitted by the color wheel component, and a time sequence of the red laser of the compensation light source is the same as a time sequence of the red light emitted by the color wheel component.

11. The light emitting device according to claim 10, wherein the color wheel component comprises a fluorescent wheel and a filter wheel rotating synchronously with the fluorescent wheel, wherein:
    the fluorescent wheel comprises a green fluorescent region, a blue scattering region, and a red fluorescent region;
    the filter wheel comprises a green filter region disposed corresponding to the green fluorescent region and a red filter region disposed corresponding to the red fluorescent region; and
    a surface of the green fluorescent region is provided with green fluorescent powder, a surface of the blue scattering region is provided with scattering powder, and a surface of the red fluorescent region is provided with red fluorescent powder.

12. The light emitting device according to claim 1, wherein:
    the color wheel component emits sequential blue light and yellow light under excitation of the excitation light source; and
    the compensation light source comprises cyan-green laser and/or red laser; the cyan-green laser of the compensation light source is turned on in the entire time sequence of the color wheel component, and a time sequence of the red laser of the compensation light source is the same as a time sequence of the yellow light emitted by the color wheel component.

13. The light emitting device according to claim 1, wherein:
    the color wheel component emits white light under excitation of the excitation light source in the entire time sequence;
    the compensation light source comprises cyan-green laser and/or red laser, and the excitation light source and the compensation light source that are comprised in the light source module are both turned on in the entire time sequence; and
    the excitation light source comprises a first blue laser device, the color wheel component comprises an all-yellow color wheel, the all-yellow color wheel emits yellow light under excitation of the first blue laser device and transmits part of blue light of the first blue laser device, and the emitted yellow light and the transmitted blue light form white light for emission.

14. The light emitting device according to claim 13, wherein:
    the excitation light source further comprises a second blue laser device, and the color wheel component further comprises an all-blue color wheel and a dichroic mirror,
    the all-blue color wheel performs scattering and decoherence on blue light emitted by the second blue laser device; and
    the dichroic mirror is used for filtering blue light in the white light emitted by the all-yellow color wheel so that the yellow light emitted by the all-yellow color wheel and standard blue light emitted by the all-blue color wheel form white light for emission.

15. A projection system, comprising the light emitting device according to claim 1.

16. The projection system according to claim 15, wherein when the color wheel component emits sequential blue light and yellow light under excitation of the excitation light source, the projection system further comprises a light splitting device, and the light splitting device comprises:
a first light path and a second light path, wherein in a time sequence of yellow light of the color wheel component, the light splitting device is used for splitting the yellow light into green light and red light, the split green light and cyan-green laser of the compensation light source are modulated through the first light path, and the split red light and red laser of the compensation light source are modulated through the second light path.

17. The projection system according to claim 16, wherein in a time sequence in which the color wheel component emits blue light, the blue light and the cyan-green laser are modulated through the first light path or the second light path.

18. The projection system according to claim 16, wherein in a time sequence in which the color wheel component emits blue light, the first light path is used for distributing the blue light, the second light path is used for distributing the cyan-green laser, and the blue light and the cyan-green laser are simultaneously modulated through the first light path and the second light path.

19. The projection system according to claim 16, wherein the light splitting device further comprises a third light path, and in a time sequence in which the color wheel component emits blue light, the third light path is used for modulating the blue light and the cyan-green laser.

20. The projection system according to claim 15, wherein when the color wheel component emits white light under excitation of the excitation light source in the entire time sequence, the projection system further comprises a light splitting device, and the light splitting device distributes blue light in the white light to a first light path for modulation, distributes red light in the white light and the red laser to a second light path for modulation, and distributes green light in the white light and the cyan-green laser to a third light path for modulation.

* * * * *